United States Patent
Hendry et al.

(10) Patent No.: US 9,912,960 B2
(45) Date of Patent: *Mar. 6, 2018

(54) VIDEO-ENCODING METHOD, VIDEO-DECODING METHOD, AND APPARATUS IMPLEMENTING SAME

(71) Applicant: LG ELECTRONICS INC., Seoul (KR)

(72) Inventors: Hendry Hendry, Seoul (KR); Seungwook Park, Seoul (KR); Byeongmoon Jeon, Seoul (KR); Joonyoung Park, Seoul (KR); Jungsun Kim, Seoul (KR); Sangoh Jeong, Seoul (KR); Chulkeun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/387,727

(22) Filed: Dec. 22, 2016

(65) Prior Publication Data

US 2017/0105016 A1    Apr. 13, 2017

Related U.S. Application Data

(63) Continuation of application No. 14/354,937, filed as application No. PCT/KR2013/003456 on Apr. 23, 2013, now Pat. No. 9,565,432.

(Continued)

(51) Int. Cl.
*H04N 19/44* (2014.01)
*H04N 19/63* (2014.01)
(Continued)

(52) U.S. Cl.
CPC .......... *H04N 19/44* (2014.11); *H04N 19/174* (2014.11); *H04N 19/33* (2014.11); *H04N 19/43* (2014.11);
(Continued)

(58) Field of Classification Search
CPC combination set(s) only.
See application file for complete search history.

(56) References Cited

U.S. PATENT DOCUMENTS

2004/0066854 A1    4/2004 Hannuksela
2007/0076801 A1    4/2007 Lim
(Continued)

FOREIGN PATENT DOCUMENTS

CN    102342127    2/2012
EP     2560389     10/2013
(Continued)

OTHER PUBLICATIONS

International Search Report dated Jul. 22, 2013 for Application No. PCT /KR2013/003456, with English Translation, 8 pages.

(Continued)

*Primary Examiner* — Sath V Perungavoor
*Assistant Examiner* — Janese Duley
(74) *Attorney, Agent, or Firm* — Fish & Richardson P.C.

(57) ABSTRACT

The present invention relates to an inter-layer prediction method and to an apparatus implementing the method. The method may comprise the steps of generating a first block constituted by the value obtained by up-sampling the reconstruction value of a reference block of a reference layer corresponding to the current block; generating a second block constituted by a prediction value derived from intra-prediction mode of the current block; and generating a prediction block of the current block by combining sample values of the first block and the second block. Thus, intra-prediction on the current layer can be performed using the intra-prediction mode information of another layer.

20 Claims, 13 Drawing Sheets

Related U.S. Application Data

(60) Provisional application No. 61/636,745, filed on Apr. 23, 2012.

(51) Int. Cl.

| | | |
|---|---|---|
| *H04N 19/61* | (2014.01) | |
| *H04N 19/593* | (2014.01) | |
| *H04N 19/33* | (2014.01) | |
| *H04N 19/59* | (2014.01) | |
| *H04N 19/70* | (2014.01) | |
| *H04N 19/43* | (2014.01) | |
| *H04N 19/895* | (2014.01) | |
| *H04N 19/68* | (2014.01) | |
| *H04N 19/174* | (2014.01) | |
| *H04N 19/503* | (2014.01) | |

(52) U.S. Cl.
CPC ........... *H04N 19/503* (2014.11); *H04N 19/59* (2014.11); *H04N 19/593* (2014.11); *H04N 19/61* (2014.11); *H04N 19/63* (2014.11); *H04N 19/68* (2014.11); *H04N 19/70* (2014.11); *H04N 19/895* (2014.11)

(56) References Cited

U.S. PATENT DOCUMENTS

| | | |
|---|---|---|
| 2008/0192830 A1 | 8/2008 | Ahn |
| 2009/0080533 A1 | 3/2009 | Folta et al. |
| 2009/0135917 A1 | 5/2009 | Kadono |
| 2013/0107953 A1 | 5/2013 | Chen |
| 2013/0272430 A1 | 10/2013 | Sullivan |

FOREIGN PATENT DOCUMENTS

| | | |
|---|---|---|
| KR | 2011-115949 | 10/2011 |
| WO | 2011/129573 | 10/2011 |

OTHER PUBLICATIONS

Search Report dated Apr. 28, 2015 for corresponding European Patent Application No. 13782395.1, 9 pages.

Sullivan, "On Random Access and Bitstream Format for JVT Video", Joint Video Team (JVT) of ISO/IEC MPEG & ITU-T VCEG (ISO/IEC JTC1/SC29/WG11 and ITU-T SG16 1.6), 2nd Meeting: Geneva, CH, Jan. 29-Feb. 1, 2002, 13 pages.

Hendry et al., "Undiscardable Leading Pictures for CRA", Joint Collaborative Team on Video Coding (JCT-VC) of ITU-T SG13 WP3 and ISO/IEC JTC1/SC29/WG11, 7th Meeting: Geneva, CH, Nov. 21-30, 2011, 7 pages.

Wang et al., "On Bitstreams Starting with CRA Pictures", Joint Collaborative Team on Video Coding (JCT-VC) of ITU-T SG13 WP3 and ISO/IEC JTC1/SC29/WG11, 8th Meeting: San Jose, CA, USA, Feb. 1-10, 2012, 6 pages.

Hendry et al., "Random Access Detection and Notification", Joint Collaborative Team on Video Coding (JCT-VC) of ITU-T SG13 WP3 and ISO/IEC JTC1/SC29/WG11, 7th Meeting: Geneva, CH, Nov. 21-30, 2011, 4 pages.

Communication pursuant to Article 94(3) EPC in European Application No. 13782395.1, dated Jan. 27, 2017, 6 pages (with English translation).

Sullivan et al., "Overview of the High Efficiency Video Coding (HEVC) Standard," IEEE Transactions on Circuits and Systems for Video Technology, Dec. 2012, 22(12):1649-1668, 20 pages (XP011487803).

Sullivan et al., Overview of the High Efficiency Video Coding (HECV) IEEE Transactions on Circuits and Systems for Video Technology, Sep. 2012, 19 pages (XP055045358).

Fujibayashi, Akira, "Random access support for HEVC," Joint Collaborative Team on Video Coding (JCT-VC) of ITU-T SG16 WP3 and ISO/IEC JTC1/SC29/WG11, Jan. 2011, 4 pages.

VIDEO-ENCODING METHOD, VIDEO-DECODING METHOD, AND APPARATUS IMPLEMENTING SAME

CROSS REFERENCE TO RELATED APPLICATIONS

This application is a continuation of U.S. application Ser. No. 14/354,937, filed Apr. 29, 2014, now allowed, which is a U.S. National Phase Application of International Application PCT/KR2013/003456, filed Apr. 23, 2013, which claims the benefit of U.S. Provisional Application No. 61/636,745, filed Apr. 23, 2012, the entire content of the prior applications is hereby incorporated by reference.

TECHNICAL FIELD

The present invention relates to a video compression technique, and more particularly, to a method of parsing compressed video information to process a video and an apparatus using the same.

BACKGROUND ART

Recently, demands for high-resolution and high-quality images have increased in various fields of applications. As images have higher resolution and higher quality, the amount of information on the images also increases.

With a growing amount of information, multi-functional devices and networks with various environments are introduced. Accordingly, the same content may be utilized with different levels of quality.

Specifically, as terminals are able to support diverse qualities of videos and various network environments are established, a video with general quality is enabled in one environment while a higher-quality video may be available in another environment.

For example, a user may enjoy video content purchased through a portable terminal on a large-screen display with higher resolution at home.

In recent years, as high definition (HD) broadcast services are available, a large number of users is getting used to high-resolution and high-quality videos and service providers and service users also pay attention to ultrahigh-definition (UHD) services having a resolution four times higher than HDTV.

Thus, there is a need to provide scalability to video quality, for example, the image quality, resolution, size and frame rate of a video, based on high-efficiency encoding and decoding methods on a high-capacity video so as to offer varied qualities of video services in different environments for users' demands.

DISCLOSURE

Technical Problem

An aspect of the present invention is to provide a method of processing a leading picture having no reference picture and an apparatus using the same.

Another aspect of the present invention is to provide a method of preventing an error in a decoding apparatus and processing a video and an apparatus using the same.

Still another aspect of the present invention is to provide a method of supporting random access to a video and decoding a clean random access (CRA) picture and an instantaneous decoding refresh (IDR) picture first in a bitstream and an apparatus using the same.

Yet another aspect of the present invention is to provide a method of dealing with an error caused in video processing and an apparatus using the same.

Technical Solution

An embodiment of the present invention provides a video processing method including receiving a bitstream comprising a plurality of pictures, and not outputting a leading picture when at least one reference picture for the leading picture that precedes a random access point picture in output order and follows the random access point picture in decoding order is unavailable.

The not outputting of the leading picture may include removing and discarding the leading picture from the bitstream, and the video processing method may further include decoding pictures after the removed leading picture.

The leading picture may be excluded from a decoding process and output process.

The pictures after the removed leading picture may be decoded after a predetermined delay time.

The leading picture may include a first leading picture not decodable and a second leading picture decodable, and the removing and discarding of the leading picture from the bitstream may exclude the first leading picture from a decoding process and output process.

The leading picture may include a first leading picture not decodable and a second leading picture decodable, and the removing and discarding of the leading picture from the bitstream may remove and discard the first leading picture and the second leading picture from the bitstream.

The leading picture may include a first leading picture not decodable, and the removing and discarding of the leading picture from the bitstream may remove and discard the first leading picture from the bitstream.

The leading picture may include a first leading picture not decodable and a second leading picture decodable, and the video processing method may further include generating an unavailable reference picture for the first leading picture and generating a flag signal blocking output of the unavailable reference picture.

The video processing method may further include decoding the second leading picture.

The leading picture may include a picture absent in the bitstream as a reference picture.

The random access point picture may be a clean random access (CRA) picture.

The video processing method may further include receiving flag information indicating that the at least one reference picture for the leading picture is unavailable.

The video processing method may further include outputting error information of the bitstream and decoding pictures after the leading picture when the at least one reference picture for the leading picture is determined to be unavailable through the flag information.

The bitstream may be determined not to satisfy predetermined conformance when the at least one reference picture for the leading picture is unavailable.

The video processing method may further include outputting error information of the bitstream and decoding pictures after the leading picture.

Advantageous Effects

An embodiment of the present invention provides a method of processing a leading picture having no reference picture and an apparatus using the same.

Another embodiment of the present invention provides a method of preventing an error in a decoding apparatus and processing a video and an apparatus using the same.

Still another embodiment of the present invention provides a method of supporting random access to a video and decoding a clean random access (CRA) picture and an instantaneous decoding refresh (IDR) picture first in a bitstream and an apparatus using the same.

Yet another embodiment of the present invention provides a method of dealing with an error caused in video processing and an apparatus using the same.

MODE FOR INVENTION

Figure 1:
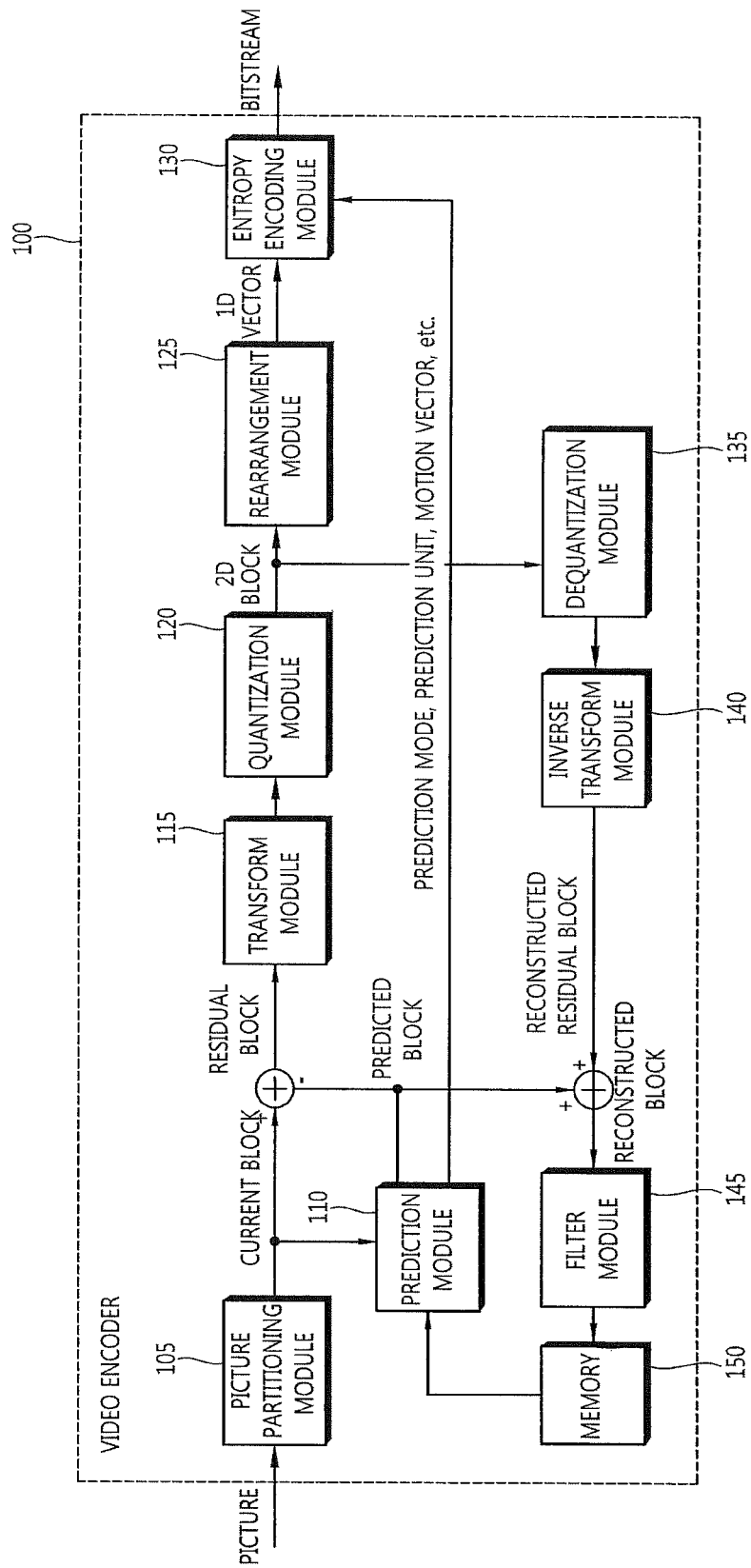
FIG. 1 is a block diagram schematically illustrating a video encoding apparatus according to an exemplary embodiment of the present invention.

The present invention may be changed and modified variously and be illustrated with reference to different exemplary embodiments, some of which will be described in detail and shown in the drawings. However, these embodiments are not intended for limiting the invention. The terminology used herein is for the purpose of describing particular embodiments only and is not intended to be limiting the technical idea of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components, and/or combinations thereof, but do not preclude the presence or addition of one or more other features, integers, steps, operations, elements, components, and/or combinations thereof.

Although elements illustrated in the drawings are independently shown for convenience of description of different distinctive functions in a video encoding apparatus/decoding apparatus, such a configuration does not indicate that each element is constructed by a separate hardware constituent or software constituent. That is, at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram schematically illustrating a video encoding apparatus according to an exemplary embodiment of the present invention. Referring to FIG. 1, the video encoding apparatus 100 includes a picture partitioning module 105, a prediction module 110, a transform module 115, a quantization module 120, a rearrangement module 125, an entropy encoding module 130, a dequantization module 135, an inverse transform module 140, a filter module 145 and a memory 150.

The picture partitioning module 105 may divide an input picture into at least one block as a processing unit. Here, the block as the processing unit may be a prediction unit (PU), a transform unit (TU) or a coding unit (CU).

Processing unit blocks divided by the picture partitioning module 105 may have a quadtree structure.

The prediction module 110 may include an inter prediction module to perform inter prediction and an intra prediction module to perform intra prediction, which will be described. The prediction module 110 generates a prediction block by performing prediction on the processing unit of the picture from the partitioning module 105. The processing unit of the picture in the prediction module 110 may be a CU, a TU or a PU. Furthermore, the prediction module 110 may determine whether prediction performed on the processing unit is inter prediction or intra prediction, and may determine details (for example, a prediction mode) of each prediction method. Here, a processing unit on which prediction is performed may be different from a processing unit for which a prediction method and details on the prediction method are determined. For example, a prediction method and a prediction mode may be determined for each PU, while prediction may be performed for each TU.

In inter prediction, a prediction block may be generated by performing prediction based on information on at least one of previous and/or subsequent pictures of a current picture. In intra prediction, a prediction block may be generated by performing prediction based on information on a pixel within the current picture.

A skip mode, a merge mode and motion vector prediction (MVP) may be used as an inter prediction method. In inter prediction, a reference picture for a PU may be selected, and a reference block corresponding to the PU may be selected. The reference block may be selected as a unit of inter pixel. Subsequently, a prediction block that has a minimum residual signal with respect to the current PU and has a minimum-size motion vector is generated.

The prediction block may be generated as an integer sample unit or as a pixel unit smaller than an integer pixel, such as a ½ pixel unit and a ¼ pixel unit. Here, the motion vector may be represented in a unit smaller than an integer pixel.

Information including an index of the reference pixel selected in inter prediction, the motion vector (e.g., a motion vector predictor) and the residual signal, is entropy-encoded and transferred to a decoding apparatus. In the skip mode, since the prediction block may be a reconstructed block without a residual, the residual may not be generated, transformed, quantized and transferred.

In intra prediction, a prediction mode is determined by a PU, and prediction may be performed by a PU. Alternatively, a prediction mode may be determined by a PU, and intra prediction may be performed in a TU.

Intra prediction may include 33 directional prediction modes and two or more non-directional modes. The non-directional modes may include a DC prediction mode and a planar mode.

In intra prediction, the prediction block may be generated after applying a filter to a reference sample. Here, whether to apply the filter to the reference sample may be determined on an intra prediction mode and/or size of a current block.

A PU may have different sizes and forms. For example, in inter prediction, a PU may be a 2N×2N, 2N×N, N×2N or N×N block (N is an integer). In intra prediction, a PU may be a 2N×2N or N×N block (N is an integer). Here, a PU having an N×N size may be applied only to a special case. For example, an N×N PU may be available only for a CU with a minimum size or only for intra prediction. In addition to the PUs with the foregoing sizes, a PU may include N×mN, mN×N, 2N×mN and mN×2N blocks (m<1).

A residual value (residual block or residual signal) between the generated prediction block and an original block is input to the transform module 115. Also, information on a prediction mode and a motion vector used for prediction are encoded along with the residual value by the entropy encoding module 130 and transferred to the decoding apparatus.

The transform module 115 transforms the residual block by a TU and generates a transform coefficient.

A transform block is a rectangular block of samples to which the same transformation is applied. The transform block may be a TU and have a quadtree structure.

The transform module 115 may perform transformation based on a prediction mode applied to the residual block and a size of the block.

For example, when intra prediction is applied to the residual block and the block has a 4×4 residual array, the transform module 115 may transform the residual block using discrete cosine transform (DCT). Otherwise, the transform module 115 may transform the residual block using discrete sine transform (DST).

The transform module 115 may generate a transform block of transform coefficients by transformation.

The quantization module 120 may quantize residual values transformed by the transform module 115, that is, the transform coefficients, to generate quantized transform coefficients. The coefficients generated by the quantization module 120 are provided to the dequantization module 135 and the rearrangement module 125.

The rearrangement module 125 rearranges the quantized transform coefficients provided by the quantization module 120. Rearranging the quantized transform coefficients may enhance encoding efficiency in the entropy encoding module 130.

The rearrangement module 125 may rearrange a two-dimensional (2D) block of the quantized transform coefficients into a one-dimensional (1D) vector using coefficient scanning.

The entropy encoding module 130 may entropy-encode the quantized transform coefficients rearranged by the rearrangement module 125. Various encoding methods, such as exponential Golomb, context-adaptive variable length coding (CAVLC) and context-adaptive binary arithmetic coding (CABAC), may be used for entropy encoding. The entropy encoding module 130 may encode various types of information, such as information on quantized transform coefficients and block type of a CU, prediction mode information, partition unit information, PU information, transfer unit information, motion vector information, reference picture information, block interpolation information and filtering information, received from the rearrangement module 125 and the prediction module 110.

Furthermore, the entropy coding module 130 may apply a change to a received parameter set or syntax as necessary.

The dequantization module 135 dequantizes the values quantized by the quantization module 120, that is, the quantized transform coefficients, and the inverse transform module 140 inverse-transforms the values dequantized by the dequantization module 135.

The residual values generated through the dequantization module 135 and the inverse transform module 140 are merged with the prediction block predicted by the prediction module 110, thereby generating a reconstructed block.

FIG. 1 illustrates that a reconstructed block is generated by merging a residual block with a prediction block through an adder. Here, the adder may be regarded as a separate module for generating a reconstructed block (reconstructed block generation module).

The filter module 145 may apply a deblocking filter, an adaptive loop filter (ALF), and a sample adaptive offset (SAO) to a reconstructed picture.

The deblocking filter may remove block distortion generated on boundaries between blocks in the reconstructed picture. The ALF may perform filtering based on a value obtained by comparing the reconstructed picture obtained by filtering blocks using the deblocking filter with the original picture. The ALF may be employed only for high efficiency. The SAO reconstructs an offset difference between the residual block to which the deblocking filter has been applied and the original picture by a pixel unit, in which a band offset or an edge offset is used.

Meanwhile, the filter module 145 may not apply filtering to a reconstructed block used in inter prediction.

The memory 150 may store the reconstructed block or picture obtained via the filter module 145. The reconstructed block or picture stored in the memory 150 may be provided to the prediction module 110 performing inter prediction.

Figure 2:
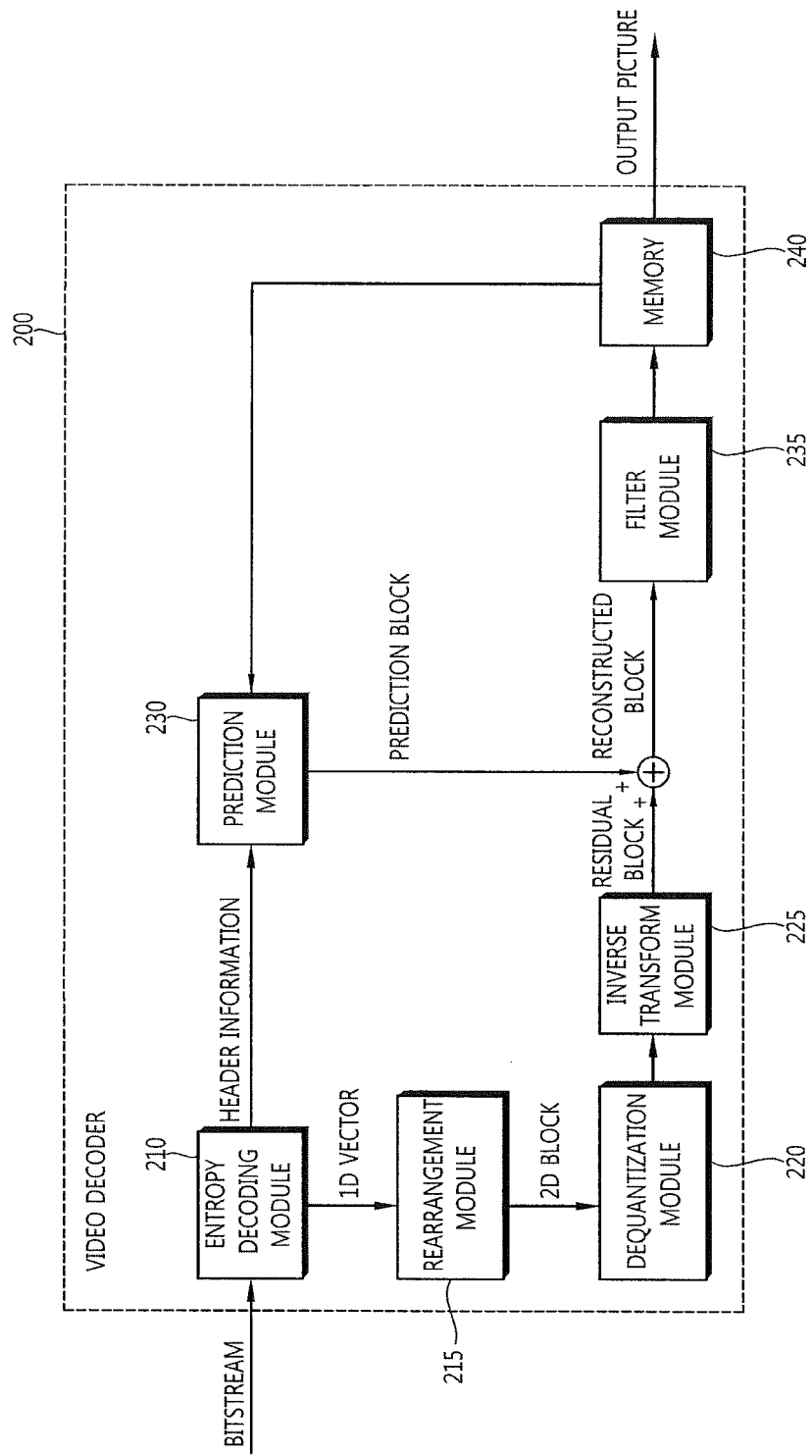
FIG. 2 is a block diagram schematically illustrating a video decoding apparatus according to an exemplary embodiment of the present invention.

FIG. 2 is a block diagram schematically illustrating a video decoding apparatus according to an exemplary embodiment of the present invention. Referring to FIG. 2, the video decoding apparatus 200 may include an entropy decoding module 210, a rearrangement module 215, an dequantization module 220, an inverse transform module 225, a prediction module 230, a filter module 235, and a memory 240.

When a video bitstream is input from the video encoding apparatus, the input bitstream may be decoded according to an inverse process by which the video encoding apparatus processes video information.

For example, when the video encoding apparatus uses variable-length coding (VLC), such as CAVLC, to perform entropy encoding, the entropy decoding module 210 may perform entropy decoding using the same VLC table as used in the encoding apparatus. Furthermore, if the video encoding apparatus uses CABAC to perform entropy ending, the entropy decoding module 210 may also perform entropy decoding using CABAC.

Among pieces of information decoded by the entropy decoding module 210, information for generating a prediction block may be provided to the prediction module 230, and a residual value, that is, a quantized transform coefficient, may be input to the rearrangement module 215.

The rearrangement module 215 may rearrange information on the bitstream entropy-decoded by the entropy decoding module 210, that is, the quantized transform coefficients, based on a rearrangement method used in the encoding apparatus.

The rearrangement module 215 may reconstruct and rearrange a 1D vector of coefficients into a 2D block of coefficients. The rearrangement module 215 may scan coefficients based on a prediction mode of a current block (transform block) and a size of the transform block to generate a 2D block of coefficients (quantized transform coefficients).

The dequantization module 220 may perform dequantization based on a quantization parameter provided from the encoding apparatus and the rearranged coefficients of the block.

The inverse transform module 225 may perform inverse DCT and/or inverse DST on a result of quantization performed by the video encoding apparatus in response to DCT and DST performed by the transform module of the encoding apparatus.

Inverse transformation may be performed on the basis of a transfer unit or a partition unit of a picture determined by the video encoding apparatus. The transform module of the video encoding apparatus may selectively perform DCT and/or DST depending on a plurality of information elements, such as a prediction method, a size of the current block and a prediction direction, and the inverse transform module 225 of the video decoding apparatus may perform inverse transformation on the basis of information on the transformation performed by the transform module of the video encoding apparatus.

The prediction module 230 may generate a prediction block based on information on generation of the prediction block provided from the entropy decoding module 210 and information on a previously decoded block and/or picture provided by the memory 240.

If a prediction mode for a current PU is an intra prediction mode, intra prediction may be performed based on information on a pixel in a current picture to generate the prediction block.

If a prediction mode for the current PU is an inter prediction mode, inter prediction for the current PU may be performed based on information on at least one of previous and subsequent pictures of the current picture. Here, motion information necessary for the inter prediction for the current PU provided by the video encoding apparatus, for example, information on a motion vector and a reference picture index, may be derived by checking a skip flag and a merge flag received from the encoding apparatus.

A reconstructed block may be generated using the prediction block generated by the prediction module 230 and the residual block provided by the inverse transform module 225. FIG. 2 illustrates that the reconstructed block is generated by the adder merging the prediction block with the residual block. Here, the adder may be regarded as a separate module for generating the reconstructed block (reconstructed block generation module).

When the skip mode is used, the prediction block may be the reconstructed block without transmitting the residual block.

The reconstructed block and/or picture may be provided to the filter module 235. The filter module 235 may apply deblocking filtering, SAO and/or AFL to the reconstructed block and/or picture.

The memory 240 may store the reconstructed picture or block to be used as a reference picture or a reference block and supply the reconstructed picture to an output unit.

Figure 3:
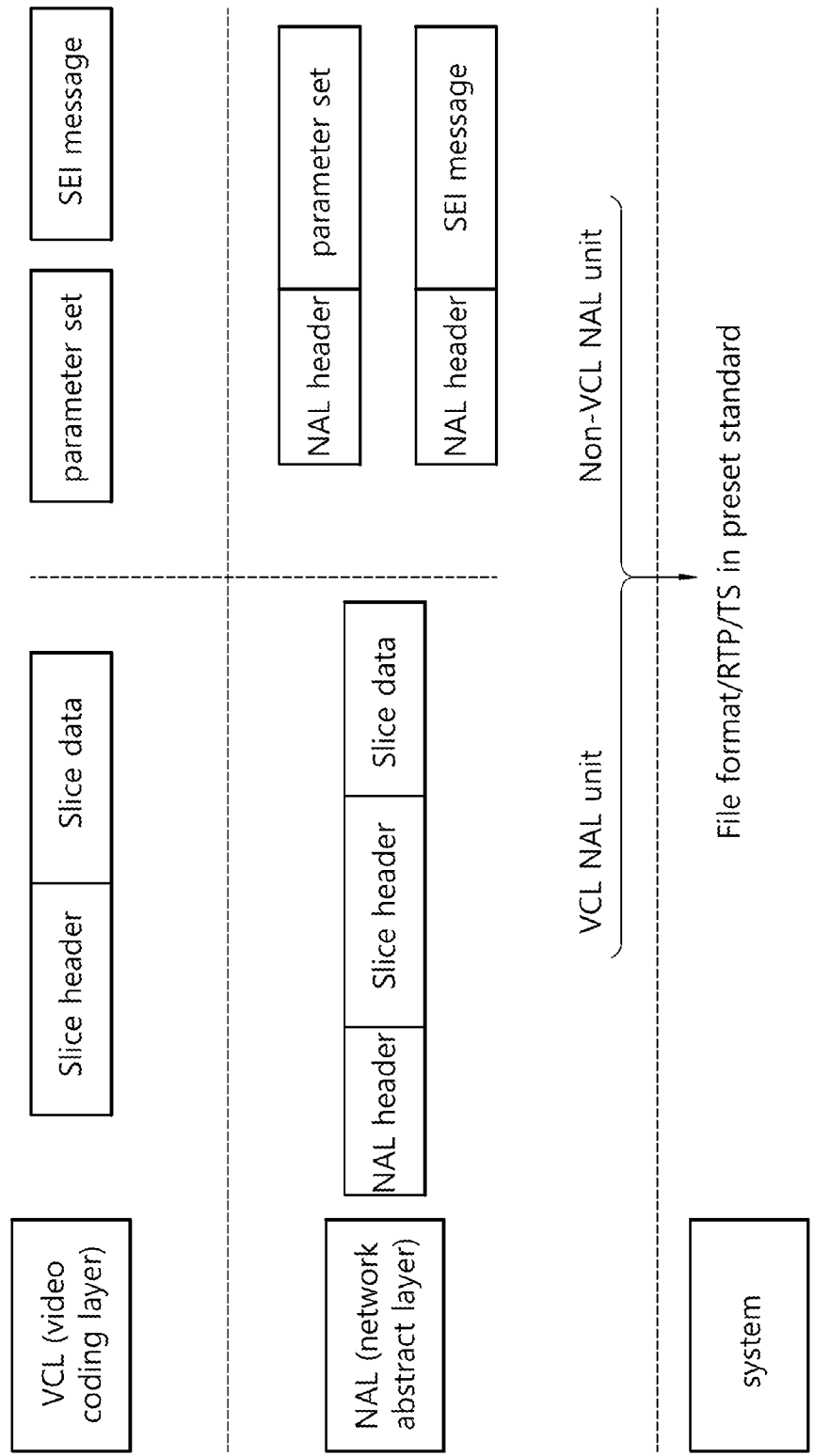
FIG. 3 illustrates a layered structure of a coded video processed by the decoding apparatus.

FIG. 3 illustrates a layered structure of a coded video processed by the decoding apparatus.

The coded video signal may be divided into a video coding layer (VCL) associated with decoding a video and dealing with the video itself and a network abstraction layer (NAL) located between the VCL and a lower system, which the lower system may transmit and store encoded information.

An NAL unit as a basic unit of the NAL serves to map the coded video onto a bit string of the lower system, such as a file format in accordance with a predetermined standard, a real-time transport protocol (RTP) and a transport stream (TS).

Meanwhile, a parameter set (picture parameter set, sequence parameter set and video parameter set) corresponding to a header of a sequence and a picture and a supplemental enhancement information (SEI) message additionally needed for video decoding are separated from information on the video (slice data).

As shown in FIG. 3, the NAL unit includes two parts of an NAL header and a raw byte sequence payload (RBSP, resulting data from video compression) generated in the VCL. The NAL header includes information on a type of the corresponding NAL unit.

The NAL unit is classified into a VCL NAL unit and a non-VCL NAL unit depending on the RBSP generated in the VCL. The VCL NAL unit is an NAL unit including the information on the video, and the non-VCL NAL unit is an NAL unit including the information (parameter set or SEI message) needed for decoding the video.

The VCL NAL unit may be classified into different types according to properties and types of a picture included in the NAL unit.

Figure 4:
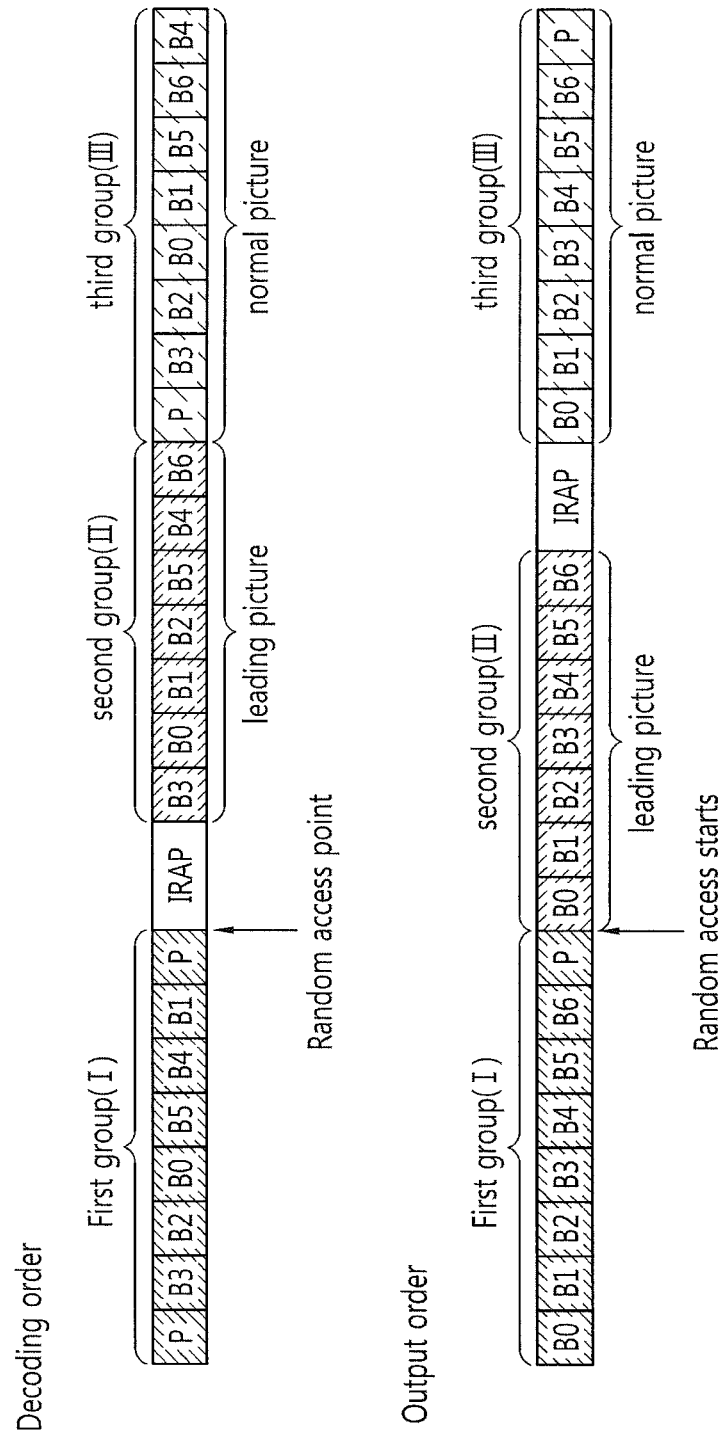
FIG. 4 illustrates a randomly accessible picture.

FIG. 4 illustrates a randomly accessible picture.

The randomly accessible picture, that is, an intra random access point (IRAP) picture as a random access point, is a first picture of a bitstream in decoding order at random access and includes I slices only.

FIG. 4 shows output order or display order and decoding order of pictures. As shown in FIG. 4, the output order of the pictures may be different from the decoding order of the pictures. For convenience of description, the pictures are divided into groups.

Pictures in a first group (I) precede the IRAP picture in both output order and decoding order, while pictures in a second group (II) precede the IRAP picture in output order but follow the IRAP picture in decoding order. Pictures in a third group (III) follow the IRAP picture in both output order and decoding order.

The pictures in the first group (I) may be decoded and output regardless of the IRAP picture.

The pictures in the second group (II) output before the IRAP picture are referred to leading pictures, which may cause a problem in a decoding process when the IRAP picture is used as a random access point, which will be described in detail.

The pictures in the third group (III) following the IRAP picture in terms of output and decoding order are referred to as manual pictures. The normal pictures are not used as a reference picture of the leading pictures.

A random access point in a bitstream at which random access happens is the IRAP picture, and random access starts as a first picture in the second group (II) is output.

Meanwhile, the IRAP picture may be any one of an instantaneous decoding refresh (IDR) picture and a clean random access (CRA) picture.

Figure 5:
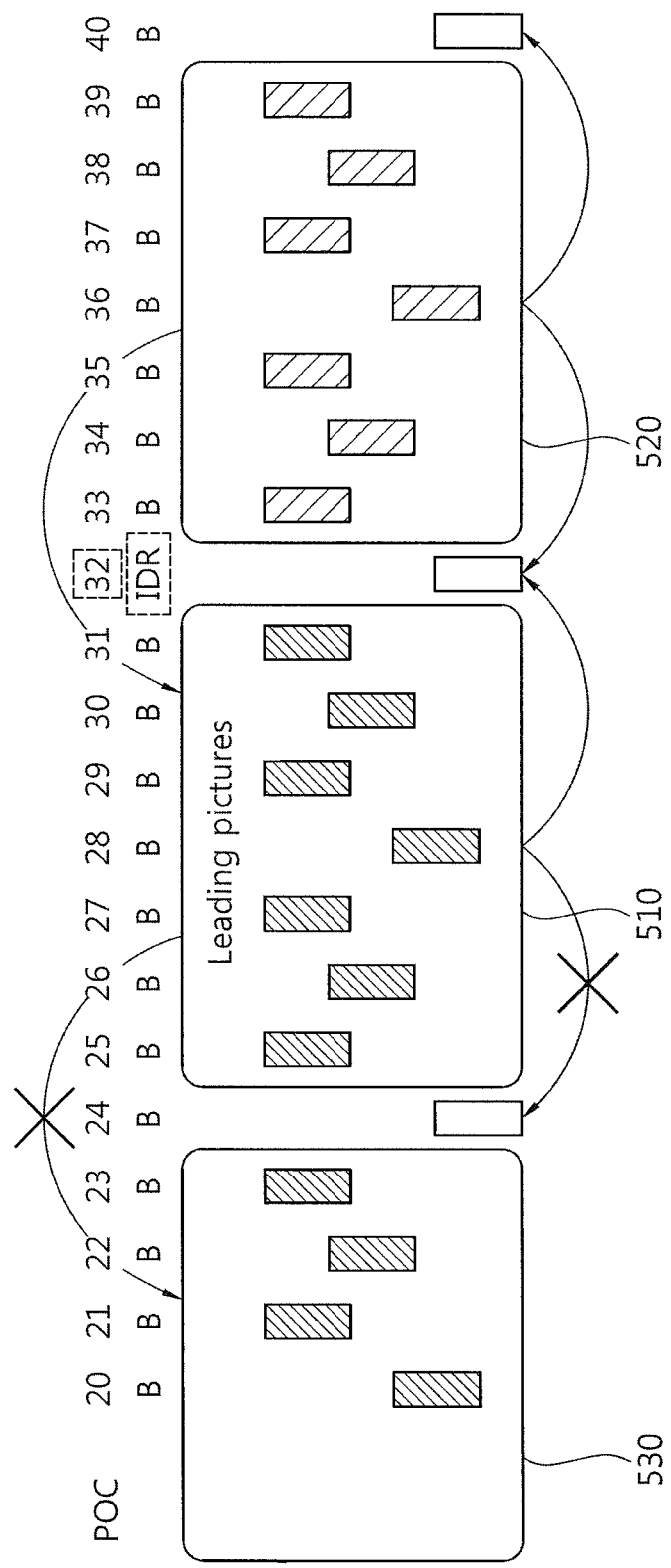
FIG. 5 illustrates an instantaneous decoding refresh (IDR) picture.

FIG. 5 illustrates an DR picture.

The IDR picture is a random access point when a picture group (GOP) has a closed structure. The IDR picture is the IRAP picture and thus includes I slices only. The IRD picture may be a first picture in a decoding procedure or appear in the middle of a bitstream. When the IDR picture is decoded, all reference pictures stored in a decoded picture buffer (DPB) are indicated as "unused for reference."

In FIG. 5, a bar represents a picture, and an arrow indicates reference relationship as to whether one picture can use another picture as a reference picture. An x mark on the arrow indicates that picture(s) cannot refer to a picture indicated by an arrow.

As shown in FIG. 5, a POC of the IDR picture is 32, and pictures having a POC ranging from 25 to 31 and being output before the IDR picture are leading pictures 510. Pictures having a POC greater than 33 are normal pictures 520.

The leading pictures 510 preceding the IDR picture may use the IDR picture and other leading pictures as reference pictures but may not use a previous picture 530 preceding the leading pictures 510.

The normal pictures 520 following the IDR picture may be decoded by referring to the IDR picture, the leading pictures and other normal pictures.

Figure 6:
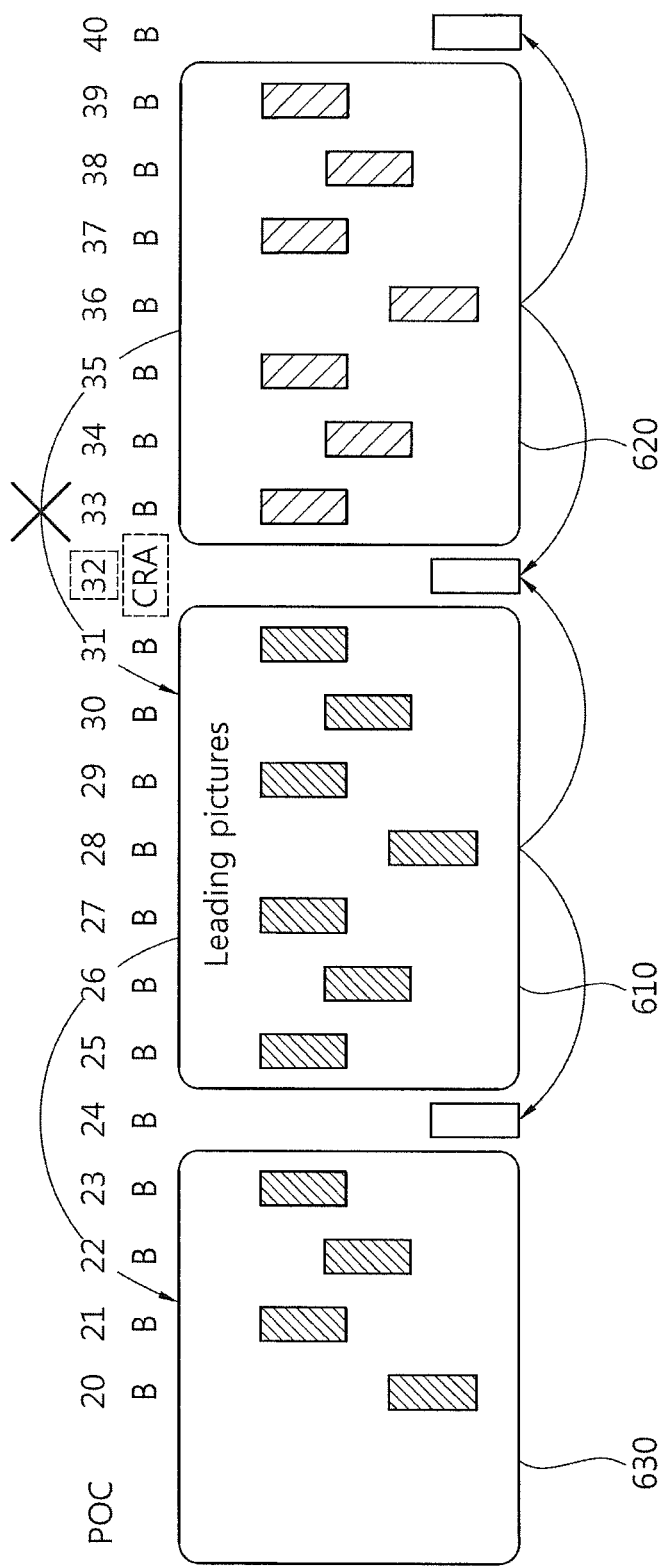
FIG. 6 illustrates a clean random access (CRA) picture.

FIG. 6 illustrates a CRA picture.

The CRA picture is a random access point when a picture group (GOP) has an open structure. The CRA picture is also the IRAP picture and thus includes I slices only. The IRD picture may be a first picture in a bitstream in a decoding procedure or appear in the middle of the bitstream for normal play.

The CRA picture may be present in the middle of the bitstream as a random access point when coded pictures are spliced or the bitstream is cut in the middle.

In FIG. 6, a bar represents a picture, and an arrow indicates reference relationship as to whether one picture can use another picture as a reference picture. An x mark on the arrow indicates that picture(s) cannot refer to a picture indicated by an arrow.

Leading pictures 610 preceding the CRA picture may use all of the CRA picture, other leading pictures and a previous picture 630 preceding the leading pictures 710 as reference pictures.

However, normal pictures 620 following the CRA picture may be decoded by referring to the CRA picture and other normal pictures but may not use the leading pictures 610 as reference pictures.

Figure 7:
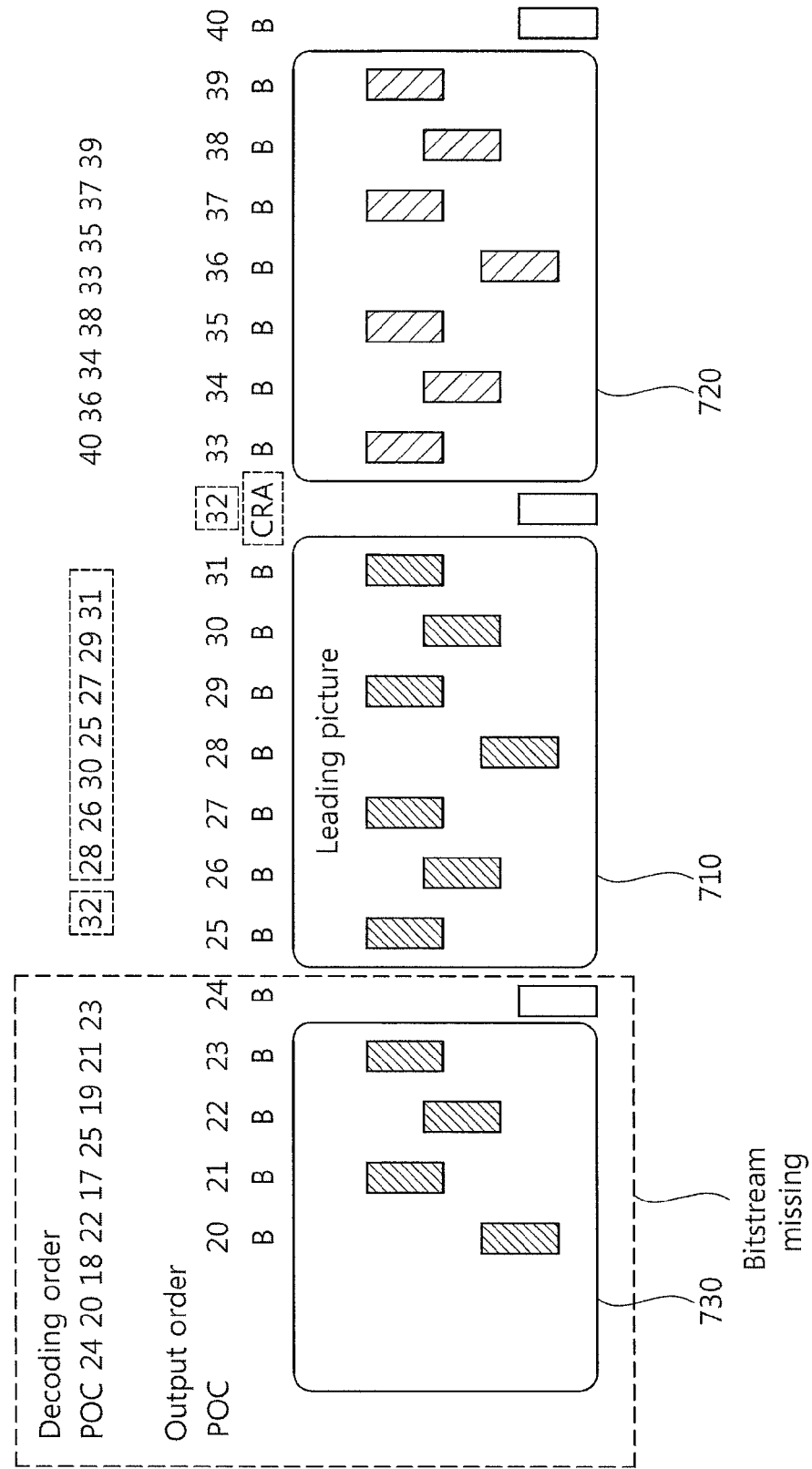
FIG. 7 illustrates a case where a picture preceding a leading picture is unavailable.

FIG. 7 illustrates a case where a picture preceding a leading picture is unavailable.

Leading pictures 710 precede a CRA picture in output order, and thus are output before the CRA picture but decoded after the CRA picture. The leading pictures 710 may refer to at least one of previous pictures 730.

As shown in FIG. 7, when a bitstream is cut in the middle or missed, or random access unexpectedly happens to the CRA picture as a picture is spliced, the previous pictures 730 preceding the CRA picture in decoding order may be unavailable. As the previous pictures 730 as possible reference pictures of the leading picture 710 are unavailable, a leading picture referring to an unavailable picture may not be properly decoded.

A case where a reference picture of a leading picture is unavailable may include cases where a leading picture includes a picture absent in a bitstream as a reference picture or a reference picture of a leading picture is not present in a decoded picture buffer (DPB).

To solve the foregoing problem, a video processing apparatus according to an exemplary embodiment of the present invention does not output a leading picture that refers to an unavailable reference picture.

Figure 8:
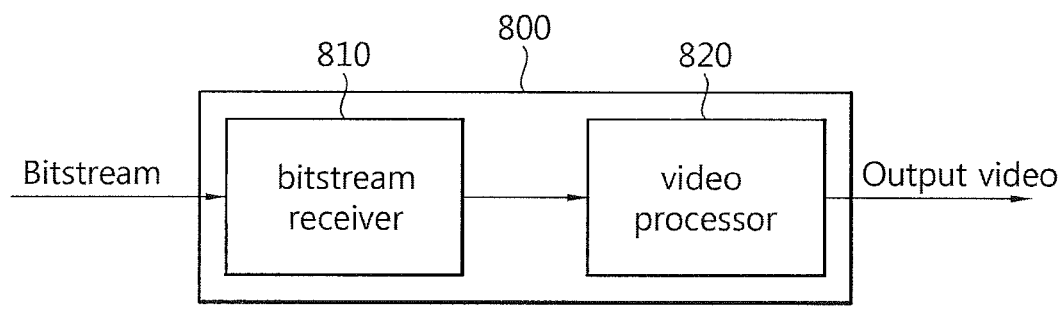
FIG. 8 is a block diagram illustrating a video processing apparatus according to an exemplary embodiment of the present invention.

FIG. 8 is a block diagram illustrating a video processing apparatus according to an exemplary embodiment of the present invention. As shown in FIG. 8, the video processing apparatus 800 includes a bitstream receiver 810 and a video processor 820.

The video processing apparatus 800 may include a module or device including the video processor 820 to perform a decoding process. The video processing apparatus 800 may be provided as a television, a video player and various terminal capable of decoding and outputting a video.

The bitstream receiver 810 receives a bitstream including a plurality of pictures.

The bitstream received by the bitstream receiver 810 is output as a video via a decoding process by the video processor 820.

The bitstream receiver 810 may include a parsing module to parse the input bitstream to obtain information needed for decoding the pictures.

The video processor 820 may include a decoding apparatus including the components described in FIG. 2 or a decoding module to perform decoding. The vide processor 820 of the present embodiment determines whether to output a leading picture based on availability of a reference picture.

Figure 9:
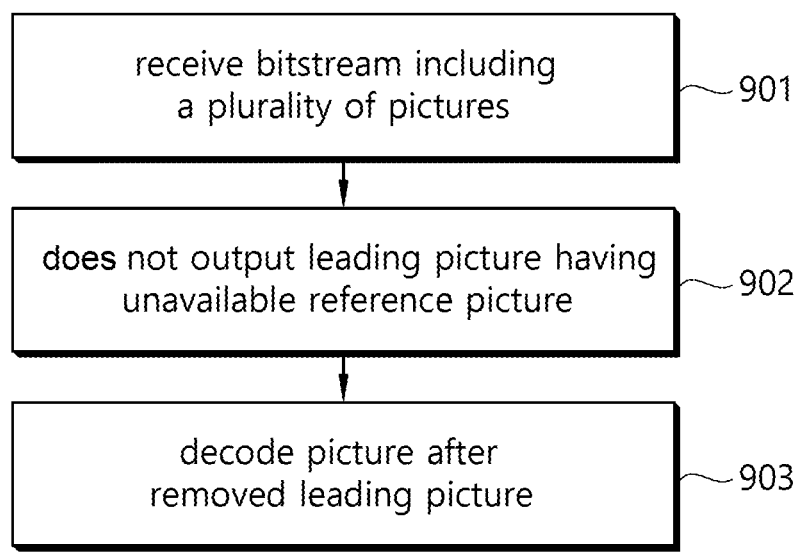
FIG. 9 is a flowchart illustrating a video processing method according to an exemplary embodiment of the present invention.

FIG. 9 is a flowchart illustrating a video processing method of the video processing apparatus 800 according to an exemplary embodiment of the present invention.

The video processing apparatus 800 receives a bitstream including a plurality of pictures (S901).

The pictures may include an IDR picture or CRA picture as a random access point. Further, the pictures may include a leading picture that precede a random access point picture in output order but follow the random access point picture in decoding order.

The video processor 820 does not output the leading picture when at least one reference picture of the leading picture is unavailable (S902).

Operation of not outputting the leading picture may include removing and discarding the leading picture from the bitstream. The discarded leading picture is excluded from a decoding process and an output process.

When a leading picture referring to an unavailable reference picture is present, the video processor 820 determines that the bitstream satisfies predetermined bitstream conformance and performs a default behavior of excluding the leading picture from an output video.

The default behavior is performed though a leading picture is not decodable, thereby preventing malfunction and errors that may occur in the video processing apparatus 800. Moreover, the video processing apparatus 800 may properly process a bitstream in which unexpected random access happens.

After the leading picture is excluded from the decoding process and the output process, the video processor 820 decodes pictures following the excluded leading picture (S903).

The pictures following the excluded leading picture refer to pictures normally decodable regardless of a missed reference picture or an absent reference picture in the bitstream.

Here, the video processor 820 delays decoding a subsequent picture for a predetermine delay time so as to maintain a picture bit string of the input bitstream, that is, to prevent overflow or underflow of a buffer storing the pictures. The video processor 820 may include a coded picture buffer (CPB) to store a coded picture and a decoded picture buffer (DPB) to store a decoded picture.

Figure 10:
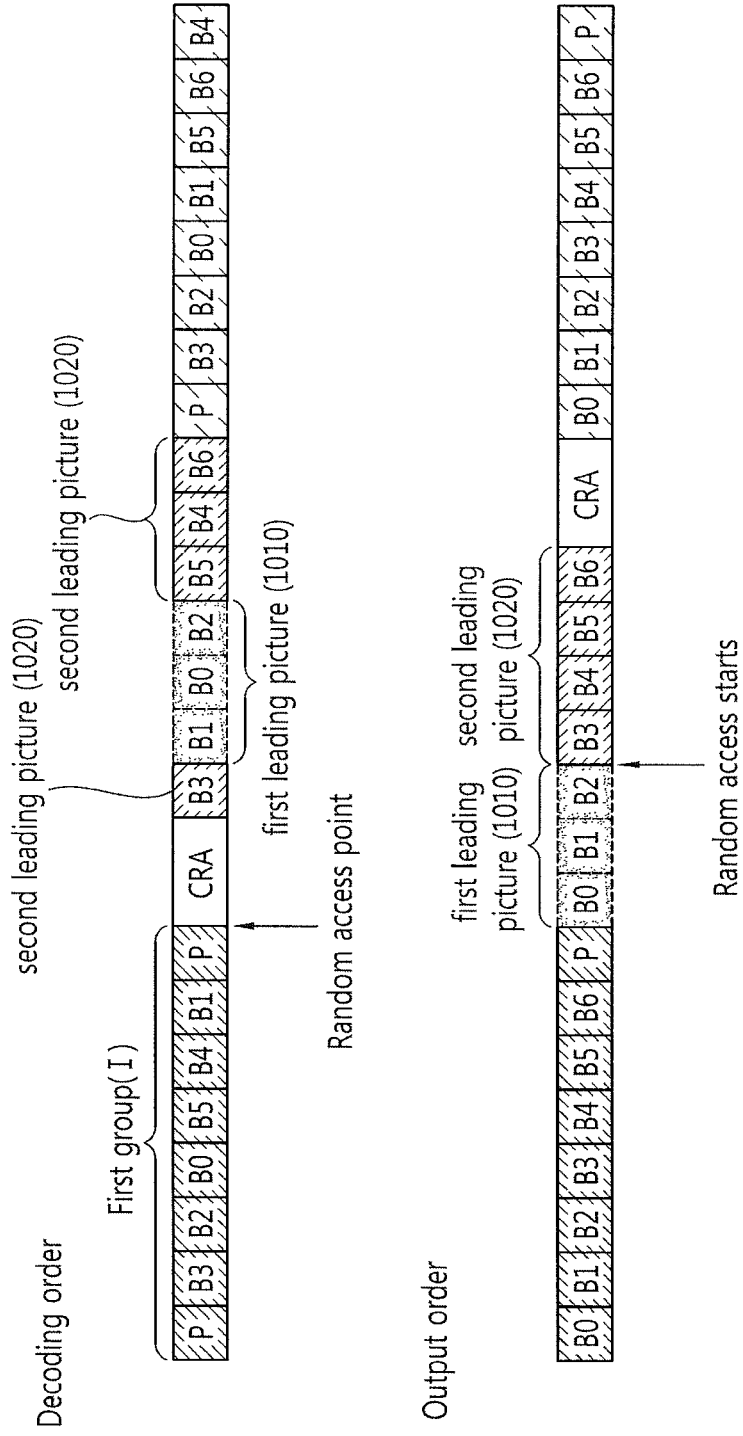
FIG. 10 illustrates removing a leading picture according to an exemplary embodiment of the present invention.

FIG. 10 illustrates removing a leading picture according to an exemplary embodiment of the present invention.

As shown in FIG. 10, a leading picture may include a first leading picture 1010 and a second leading picture 1020.

The pictures included in the first group I may include a picture that the leading pictures cannot refer to. The first group I may include pictures to be currently decoded, that is, a CRA picture and pictures irrelevant to the leading pictures 1010 and 1020.

The first leading picture 1010 refers to a picture that is not normally decoded, for example, a picture referring to an unavailable reference picture, and the second leading picture 1020 is a picture to be normally decoded regardless of the first leading picture 1010.

Among the leading pictures 1010 and 1020, B0, B1 and B2 are first leading pictures 1010, and B3 to B6 are second leading pictures 1020.

According to the present embodiment, the first leading pictures 1010 which are not decodable are excluded from the decoding process and the output process. The first leading pictures 1010 may be removed and discarded from the bitstream.

The video processor 820 decodes and outputs the second leading pictures 1020, excluding the first leading pictures 1010 from the decoding process and the output process. As the second leading pictures 1020 are output, random access starts.

Here, the video processor 820 may delay decoding the second leading pictures 1020 in view of bitstream timing with respect to the removed leading pictures 1010.

Figure 11:
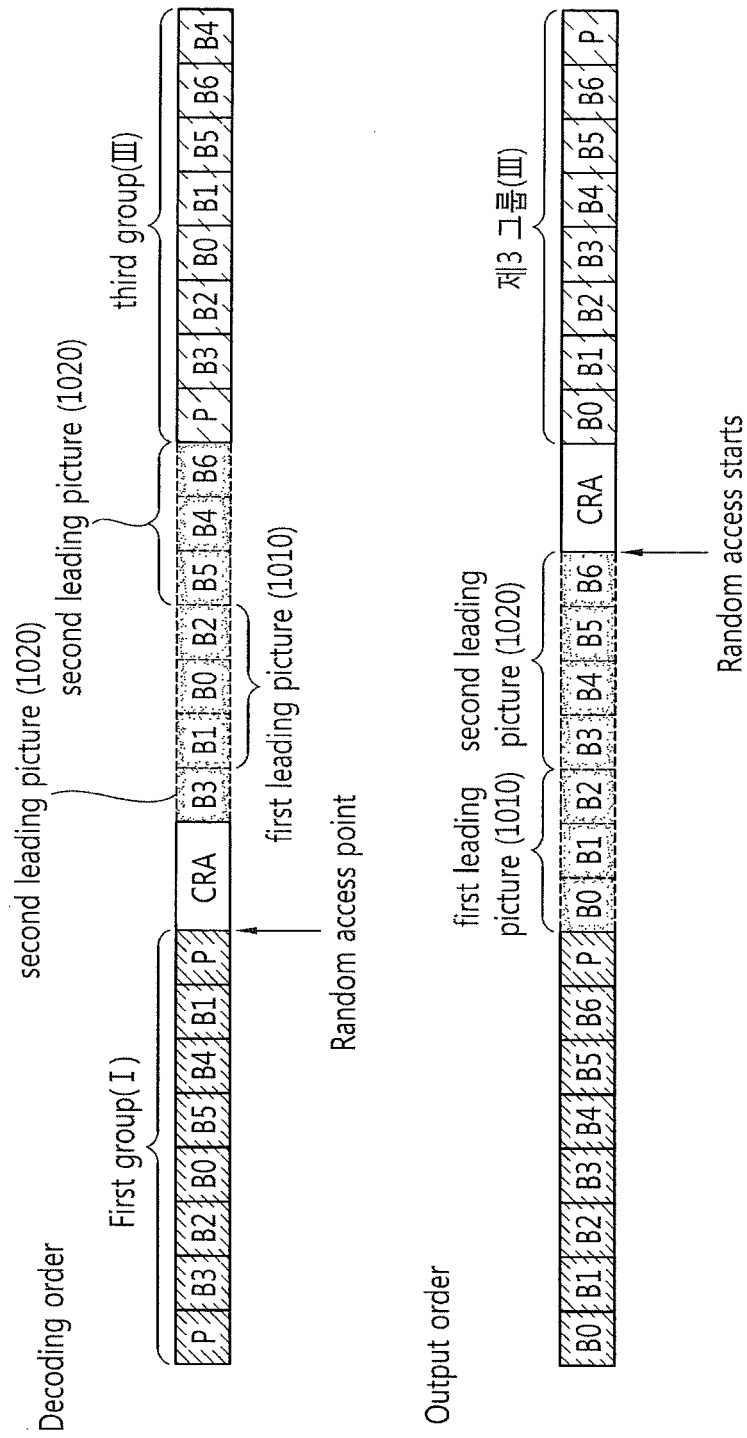
FIG. 11 illustrates removing a leading picture according to another exemplary embodiment of the present invention.

FIG. 11 illustrates removing a leading picture according to another exemplary embodiment of the present invention.

As shown in FIG. 11, a leading picture may include a first leading picture 1110 and a second leading picture 1120.

As mentioned above, the first leading picture 1110 refers to a picture that is not normally decoded, for example, a picture referring to an unavailable reference picture, and the second leading picture 1120 is a picture to be normally decoded regardless of the first leading picture 1110.

Among the leading pictures 1110 and 1120, B0, B1 and B2 are first leading pictures 1110, and B3 to B6 are second leading pictures 1120.

According to the present embodiment, the video processor 820 may exclude not only the first leading pictures 1110 which are not decodable but also the second leading pictures 1120 normally decodable from the decoding process and the output process. The video processor 820 may remove and discard the first leading pictures 1110 and the second leading pictures 1120 from the bitstream.

The video processor 820 decodes and outputs pictures after the first leading pictures 1110 and the second leading pictures 1120 which are excluded from the decoding process and the output process, that is, the pictures in the third group III.

Here, the video processor 820 may delay decoding a subsequent picture for a predetermine delay time so as to prevent overflow or underflow of a buffer of the removed leading pictures 1110 and 1120.

After the predetermined delay time since the CRA picture as a random access point is decoded, the pictures in the third group III are decoded and the decoded CRA picture and pictures in the third group III are sequentially displayed.

Figure 12:
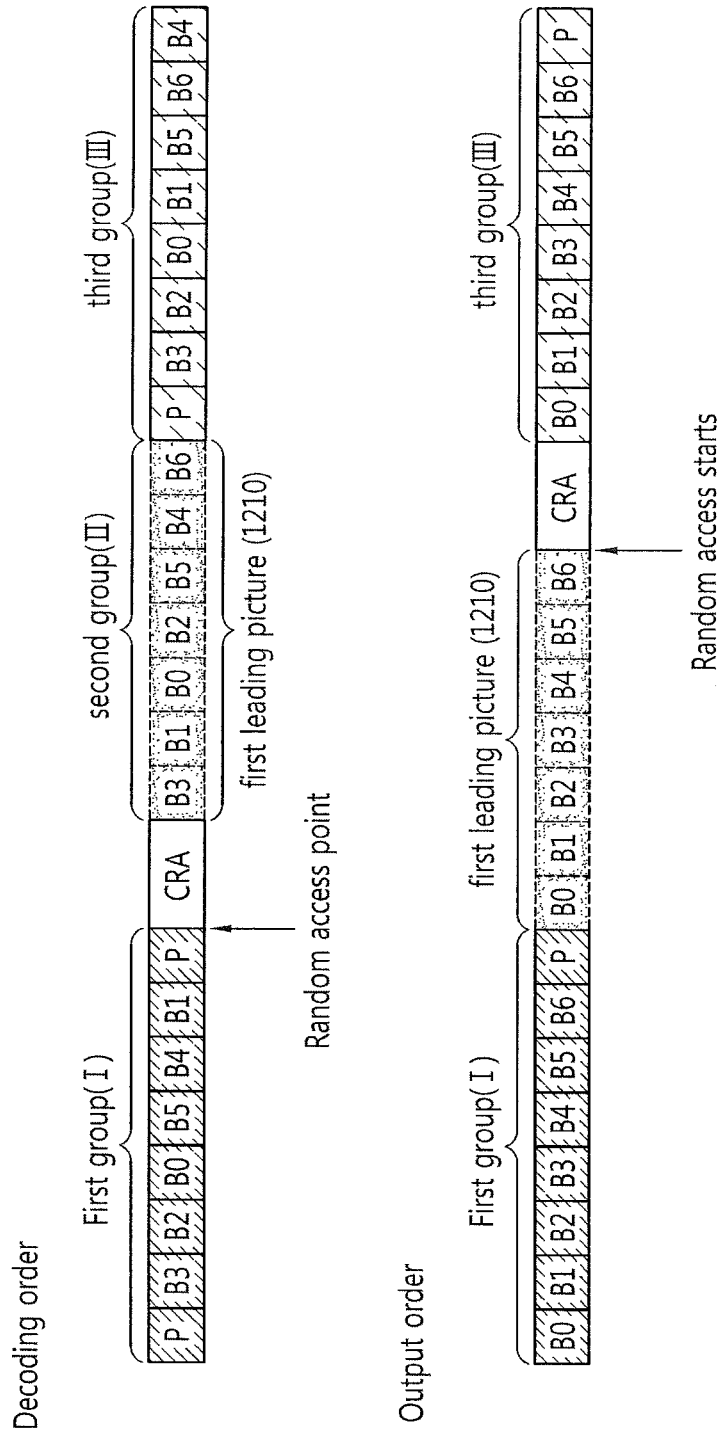
FIG. 12 illustrates removing a leading picture according to still another exemplary embodiment of the present invention.

FIG. 12 illustrates removing a leading picture according to still another exemplary embodiment of the present invention.

As shown in FIG. 12, a leading picture may include a first leading picture 1210 that refers to an unavailable reference picture only. That is, pictures B0 to B6 in the second group II after the CRA picture are first leading pictures 1210 that refer to an unavailable reference picture.

The video processor 820 may exclude all first leading pictures 1210 not decodable from the decoding process and the output process. The first leading pictures 1210 may be removed and discarded from the bitstream.

The video processor 820 decodes and outputs the pictures in the third group III after the first leading pictures 1210 excluded from the decoding process and the output process.

After a predetermined delay time since the CRA picture as a random access point is decoded, the video processor 820 decodes the pictures in the third group III and sequentially outputs the decoded CRA picture and the pictures in the third group.

Figure 13:
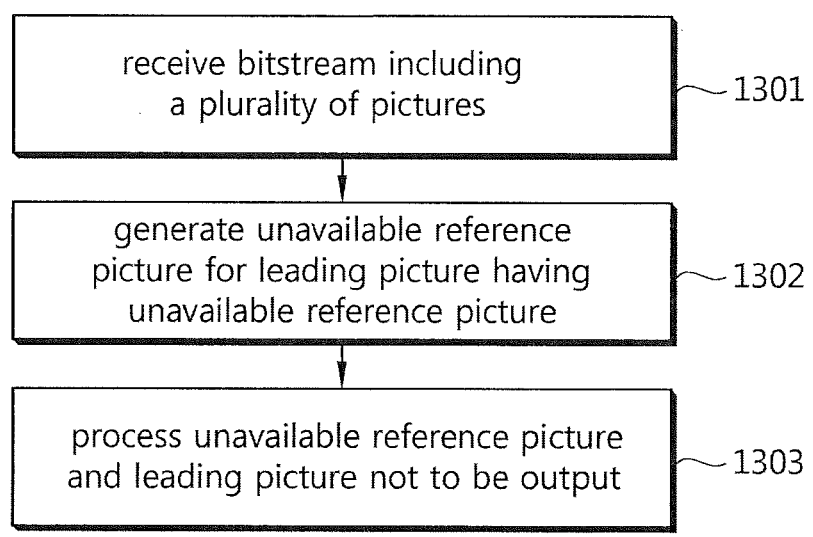
FIG. 13 is a flowchart illustrating a video processing method according to another exemplary embodiment of the present invention.

FIG. 13 is a flowchart illustrating a video processing method according to another exemplary embodiment of the present invention.

A bitstream including a plurality of pictures is received (S1301).

Pictures may include a random access point picture, a leading picture that precedes the random access point picture in output order and follows the random access point picture in decoding order, and a normal picture that follows the random access point picture in both output order and decoding order. The leading picture may include at least one of a first leading picture not decodable and a second leading picture decodable. The first leading picture may refer to a picture absent in the bitstream or an unavailable picture.

When the first leading picture is present in the bitstream, the video processor generates an unavailable reference picture for the first leading picture (S1302).

Although the first leading picture is not output and does not affect a decoding process of another picture, the video processor operates as if the first leading picture is decoded, by generating the unavailable reference picture for the first leading picture, that is, a virtual reference picture.

A sample value of the unavailable reference picture may be generated as an median value of a possible sample value that the picture has.

The video processor sets a flag signal indicating whether to output of the unavailable reference picture to 0 so as not to output the picture and processes the first leading picture not to be output (S1303).

After processing the first leading picture not decodable, the video processor decodes the second leading picture normally decodable.

According to the present embodiment, the video processing apparatus may receive flag information on the leading picture and process the leading picture based on the received flag information. Table 1 illustrates a syntax including the flag information on the leading picture.

TABLE 1

|  | Descriptor |
|---|---|
| seq_parameter_set_rbsp( ) { | |
| ... | |
| broken_link_leading_pics_enable_flag | u(1) |
| ... | |
| } | |

In Table 1, when broken_link_leading_pics_enable_flag is 1, at least one reference picture for the leading picture is unavailable. When broken_link_leading_pics_enable_flag is 0, the leading picture does not include the unavailable reference picture. For instance, when the reference picture is missed, broken_link_leading_pics_enable_flag is 1.

When broken_link_leading_pics_enable_flag is 1, the video processor may remove the leading picture including the unavailable reference picture from the decoding process and the output process.

The leading picture may include the first leading picture not normally decodable and the second leading picture normally decodable.

The video processor may remove only the first leading picture from the decoding and output processes or remove all leading pictures from the decoding and output processes regardless of the first and second leading pictures.

Alternatively, the video processor may generate an unavailable reference picture for the first leading picture including the unavailable reference picture. In this case, the generated unavailable reference picture and the first leading picture are not output.

To sum up, the video processor may receive flag information indicating that at least one reference picture for the leading picture is unavailable and perform one of operations illustrated in FIGS. 10 to 13 based on the flag information.

Meanwhile, the video processing apparatus may not only receive flag information broken_link_leading_pics_enable_flag but also analyze properties of the pictures included in the bitstream to set broken_link_leading_pics_enable_flag.

The video processor may remove the leading picture from the decoding and output processes based on the flag information set up in an upper system level.

according to another exemplary of the present embodiment, when the flag information of Table 1 is received, the video processor may determine that the bitstream does not satisfy the predetermined bitstream conformance and perform a corresponding subsequent operation.

For example, the video processor may stop decoding a video and output an error caused in the decoding process. Error information may be reported to an upper system level of the video processor, for example, an application or video player level. The video processor may receive an instruction on a subsequent operation against the error from the upper system level or perform a default operation.

The video processor may output the error and then decode decodable pictures after the leading picture.

Alternatively, the video processor may determine that the bitstream does not satisfy the predetermined bitstream conformance when at least one reference picture for the leading picture is unavailable.

That is, when a picture not normally decodable is found, the video processor may determine that the bitstream does not satisfy the predetermined bitstream conformance and perform a corresponding subsequent operation even though the flag information on the leading picture is not received.

The video processor may stop the decoding process and output the error caused in the decoding process. Error information may be reported to an upper system level of the video processor, for example, an application or video player level. The video processor may receive an instruction on a subsequent operation against the error from the upper system level or perform a default operation.

The video processor may output the error and then decode decodable pictures after the leading picture.

Although methods of illustrative systems have been described with a series of stages or blocks based on the flowcharts, the present invention is not limited to the foregoing sequence of the stages. Some stages may be carried out in different order from described above or at the same time. Further, it should be noted that as the aforementioned embodiments may include various aspects of examples, combinations of the embodiments may be also understood as exemplary embodiments of the present invention. Thus, it will be appreciated by those skilled in the art that changes, modifications and alternatives may be made in these exemplary embodiments without departing from the principles and spirit of be the invention, the scope of which is defined in the appended claims and their equivalents.

The invention claimed is:

1. A video decoding method, performed by a decoding apparatus, comprising:
   receiving a bitstream comprising information on a random access point picture, leading pictures and normal pictures, wherein the leading pictures precede the random access point picture in output order and the normal pictures follow the random access point picture in output order;
   decoding the random access point picture based on the information;
   decoding at least one of the leading pictures or the normal pictures based on the information;
   outputting the decoded random access point picture; and
   outputting the normal pictures,
   wherein the random access point picture is a clean random access (CRA) picture or an instantaneous decoding refresh (IDR) picture,
   wherein the leading pictures are not used as reference pictures for the normal pictures,
   wherein the leading pictures precede the normal pictures in decoding order,
   wherein a leading picture associated with the CRA picture is not output if the random access point picture is the CRA picture and a random access happens to the CRA picture, and
   wherein a leading picture associated with the IDR picture is decoded by using at least one of the IDR picture or another leading picture as a reference picture if the random access point picture is the IDR picture and the random access happens to the IDR picture.

2. The method of claim 1, wherein the leading picture associated with the CRA picture is discarded from the bitstream when the random access point picture is the CRA picture and the random access happens to the CRA picture.

3. The method of claim 1, wherein the leading picture associated with CRA picture has the non-decodable picture type and the leading picture associated with the IDR picture has the decodable picture type.

4. The method of claim 1, wherein the leading picture associated with the CRA picture contain references to pictures that are not present in the bitstream and the leading picture associated with the CRA picture is not decodable when the random access point picture is the CRA picture and the random access happens to the CRA picture.

5. The method of claim 4, wherein normal pictures follows the leading picture associated with the CRA picture, in decoding order, are decoded after a predetermined delay time.

6. The method of claim 4, wherein types of leading pictures comprises non-decodable picture type and decodable picture type, and the leading picture associated with the CRA picture is the non-decodable picture type.

7. The method of claim 4, wherein the leading picture associated with the CRA picture refers to a reference picture that is not present in the bitstream.

8. The method of claim 4, wherein the bitstream includes flag information indicating that the leading picture associated with the CRA picture is not output.

9. The method of claim 8, further comprising outputting error information of the bitstream and decoding pictures after the leading picture associated with the CRA picture when the at least one reference picture for the leading picture associated with the CRA picture is determined to be unavailable through the flag information.

10. The method of claim 8, wherein the leading picture associated with the CRA picture is not output when the random access point picture is the CRA picture and flag information represents the leading picture associated with the CRA is not output.

11. A video decoding apparatus, comprising:
a receiver configured to receive a bitstream comprising information on a random access point picture, leading pictures and normal pictures, wherein the leading pictures precede the random access point picture in output order and the normal pictures follow the random access point picture in output order; and
a video processor configured to decode the random access point picture based on the information, to decode at least one of the leading pictures or the normal pictures based on the information, to output the decoded random access point picture, and to output the normal pictures,
wherein the random access point picture is a clean random access (CRA) picture or an instantaneous decoding refresh (IDR) picture,
wherein the leading pictures are not used as reference pictures for the normal pictures,
wherein the leading pictures precede the normal pictures in decoding order,
wherein a leading picture associated with the CRA picture is not output if the random access point picture is the CRA picture and a random access happens to the CRA picture, and
wherein a leading picture associated with the IDR picture is decoded by using at least one of the IDR picture or another leading picture as a reference picture if the random access point picture is the IDR picture and the random access happens to the IDR picture.

12. The apparatus of claim 11, wherein the leading picture associated with the CRA picture is discarded from the bitstream when the random access point picture is the CRA picture and the random access happens to the CRA picture.

13. The apparatus of claim 11, wherein the leading picture associated with CRA picture has the non-decodable picture type and the leading picture associated with the IDR picture has the decodable picture type.

14. The apparatus of claim 11, wherein the leading picture associated with the CRA picture contain references to pictures that are not present in the bitstream and the leading picture associated with the CRA picture is not decodable when the random access point picture is the CRA picture and the random access happens to the CRA picture.

15. The apparatus of claim 14, wherein normal pictures follows the leading picture associated with the CRA picture, in decoding order, are decoded after a predetermined delay time.

16. The apparatus of claim 14, wherein types of leading pictures comprises non-decodable picture type and decodable picture type, and the leading picture associated with the CRA picture is the non-decodable picture type.

17. The apparatus of claim 14, wherein the leading picture associated with the CRA picture refers to a reference picture that is not present in the bitstream.

18. The apparatus of claim 14, wherein the bitstream includes flag information indicating that the leading picture associated with the CRA picture is not output.

19. The apparatus of claim 18, wherein the video processor outputs error information of the bitstream and decoding pictures after the leading picture associated with the CRA picture when the at least one reference picture for the leading picture associated with the CRA picture is determined to be unavailable through the flag information.

20. The apparatus of claim 18, wherein the leading picture associated with the CRA picture is not output when the random access point picture is the CRA picture and flag information represents the leading picture associated with the CRA is not output.

* * * * *